A. F. WALKER & J. GILLES.
TIRE ARMOR.
APPLICATION FILED FEB. 8, 1909.
978,243.
Patented Dec. 13, 1910.
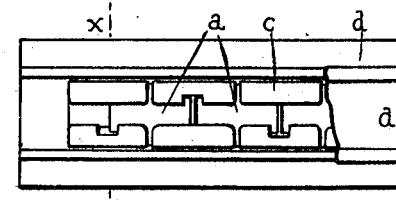
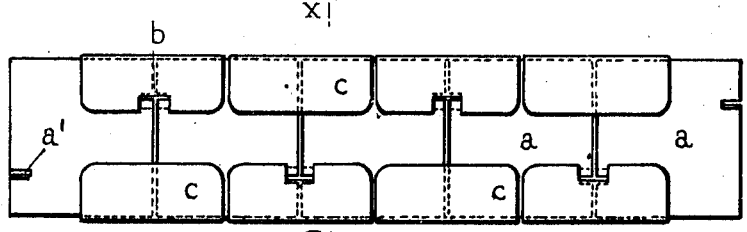
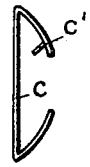
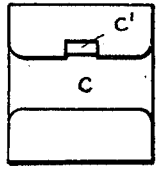
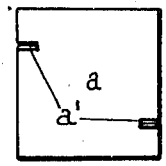
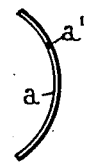
Fig. 5. Fig. 4. Fig. 6. Fig. 7.
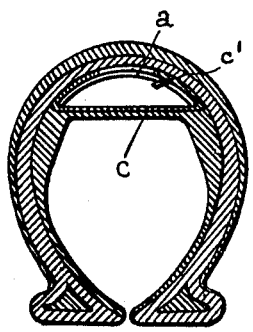
Fig. 8.
Witnesses—
Inventors
Arthur Francis Walker
John Gilles
by
Attorney.

UNITED STATES PATENT OFFICE.

ARTHUR FRANCIS WALKER, OF HERNE HILL, AND JOHN GILLES, OF BRIXTON, LONDON, ENGLAND.

TIRE-ARMOR.

978,243.  Specification of Letters Patent.  Patented Dec. 13, 1910.

Application filed February 8, 1909. Serial No. 476,738.

*To all whom it may concern:*

Be it known that we, ARTHUR FRANCIS WALKER, engineer, a subject of the King of Great Britain and Ireland, residing at 230 Railton road, Herne Hill, London, S. E., and JOHN GILLES, engineer, a subject of the King of Great Britain and Ireland, residing at 6 Margate road, Lyham Road, Brixton, London, S. W., have invented a certain new and useful Tire-Armor, of which the following is a specification.

This invention relates to puncture preventing bands more particularly applicable to pneumatic tires and has for its object to provide a band which while being effective in preventing puncture of the air tube does not impair the flexibility or efficiency of the tire.

The invention is illustrated in the accompanying drawings in which—

Figure 1 represents a plan view of the armor as intended for cycles. Fig. 2 is a cross section corresponding thereto, taken on the line X X of Fig. 1. Fig. 3 is a plan view of an armor as intended for motor cars and the like. Fig. 4 is a plan view of a clip plate. Fig. 5 is an end view corresponding to Fig. 4. Fig. 6 is a plan view of a segmental plate. Fig. 7 is an end elevation corresponding to Fig. 6. Fig. 8 is a cross-sectional view of a tire fitted with the armor taken on a line between two adjacent plates.

According to the invention we provide an armor of steel plate or other similar resistant and elastic metal which armor we form from a number of relatively small plates or segments $a$ which are arched or curved in form corresponding to the shape of the inner tube or outer cover and are caused to aline one with the other to form a complete circumference with a slight clearance $b$ between them to permit expansion and according to the invention we secure these plates or segments together by means of clips $c$ which pass transversely under the edges of the respective plates or segments $a$ and are turned over and pressed to engage the edges thereof. A substantially D shaped hollow armor is thus formed by means of the segmental plates $a$ and the clips $c$ which connect them together.

In order to prevent sliding movement of the plates $a$ relatively to the clip plates $c$ we provide stops $c'$ upon the upper part of the clips $c$. This may be effected conveniently by cutting a part of a clipping plate on one side and turning inwardly a lip to serve or for engagement with a slot provided in the segmental plate. We do not however, confine ourselves to any particular form of stop.

An armor so provided may be mounted within two strips $d$ of canvas which may have a lining on the inner face of rubber to form a bed above and below the rim so that thus a band is provided which cannot injure the tire and which is flexible circumferentially.

It is preferred to provide the metallic plates as narrow as possible corresponding in width to the tread of the tire. The strips of canvas may be dispensed with and the armor may be mounted between the inner tube and the outer covering as in Fig. 8, but it is preferred to secure the armor thus mounted between strips as hereinbefore described on the inside of the outer cover.

What we claim as our invention and desire to secure by Letters Patent is:—

1. A tire armor comprising a series of plates provided at each side with a slot, clip plates having turned-up edges, inwardly turned lips provided in the turned-up edges of the clip plates, the said lips engaging with the slots in the plates substantially as described.

2. A tire armor comprising a series of plates provided at each side with a slot, the said plates being arched or curved to the form of the tire, clip plates passing transversely under the edges of the respective plates, said clip plates being provided with turned-up edges, inwardly turned lips provided on the turned-up edges of the clip plates, the said lips engaging with the slots of the plates substantially as described.

In testimony whereof we have hereunto signed our names to this specification in the presence of two subscribing witnesses.

ARTHUR FRANCIS WALKER.
JOHN GILLES.

Witnesses:
H. D. JAMESON,
F. L. RAND.